May 19, 1931.   A. H. MUMAUGH   1,806,211
GEAR SHIFT CONTROL MECHANISM
Filed June 20, 1930
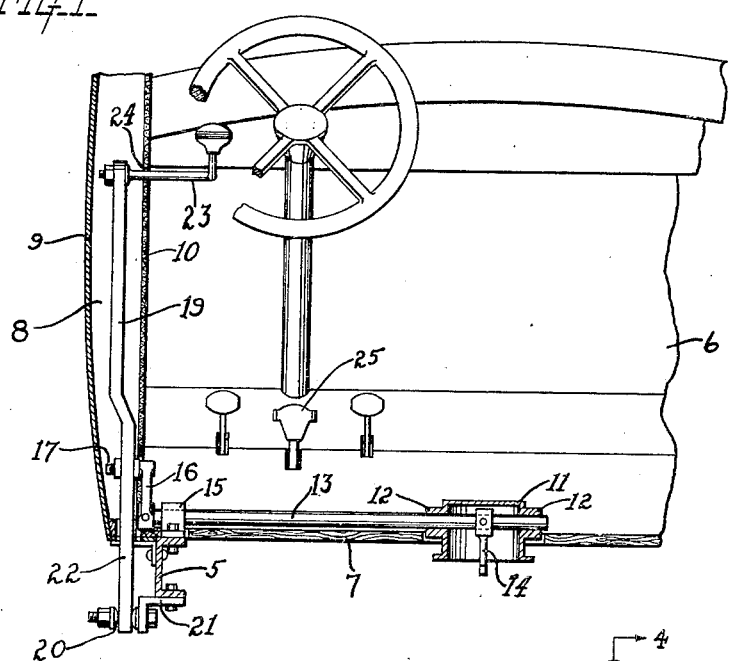
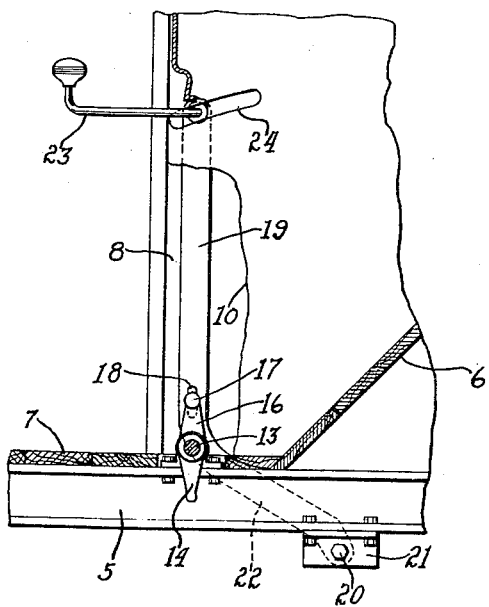
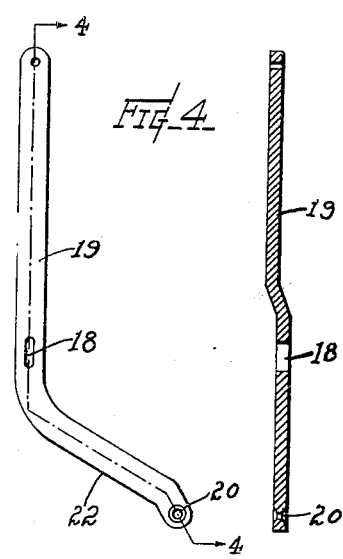
Inventor
Arthur H. Mumaugh
By Owen & Owen
Attorneys Patented May 19, 1931

1,806,211

UNITED STATES PATENT OFFICE

ARTHUR H. MUMAUGH, OF TOLEDO, OHIO, ASSIGNOR OF ONE-HALF TO WILLIAM J. JACOBS, OF TOLEDO, OHIO

GEAR SHIFT CONTROL MECHANISM

Application filed June 20, 1930. Serial No. 462,482.

This invention relates to a gear shift control mechanism particularly adapted for use in connection with motor vehicles. In motor vehicles as heretofore generally used, the gear shift lever is fulcrumed in the cover to the transmission case and projects upwardly from the floor of the tonneau, where it constitutes a material obstruction to the persons in the front seat and the legs of such persons often interfere with the movement of the lever in shifting. With the above facts in mind, the object of the present invention is to provide an improved control mechanism which may be connected with the usual gear shift mechanism, and which leaves the leg room in the front part of the tonneau entirely clear of obstruction. It also makes it easy for the driver to enter and leave the car on the right hand side thus avoiding the hazard of getting out of the left hand side in the path of moving traffic. In its preferred form, the shifting yoke is secured to a rock shaft which extends transversely along the floor and is operatively connected to a lever extending upwardly within the side wall of the tonneau and thence through a slot in the wall lining to a point near the dash and within convenient reach of the driver.

The invention will be more particularly described in connection with the accompanying drawings in which Figure 1 is a transverse section through a portion of the tonneau and parts associated therewith illustrating the invention applied thereto.

Figure 2 is a vertical section taken at right angles to Figure 1.

Figure 3 is a detail view of the shifting lever according to the invention.

Figure 4 is a section taken on the line 4—4 of Figure 3.

As illustrated in the drawings, the numeral 5 indicates a longitudinal bar of the chassis to which is secured a tonneau 6 having a floor 7 and a side wall constructed in the usual manner with a space 8 between the outer sheet metal covering 9 and the inner lining 10. The transmission gear case is provided with a cover 11 extending up through the floor 7 and formed with bearing lugs 12 in which the inner end of a rock shaft 13 is mounted. The gear shift yoke 14 is secured to the shaft 13 within the cover 11 and the shaft 13 is mounted for rocking and sliding movement to selectively control the shifting of the gears. The outer end of the shaft 13 is mounted in a bearing member 15 secured to the bar 5 and is provided with a crank 16 having a pin 17 extending through a slot in the wall lining 10.

Within the cavity 8 in the side wall the pin 17 is connected with a slot 18 formed in a lever 19 which has at its lower end a universal connection 20 constituting a fulcrum which may be secured to the bar 5 by a bracket as indicated at 21. Thus the lever 19 may be rocked laterally to shift the yoke 14 laterally and may be rocked longitudinally to effect a corresponding movement of the yoke 14.

The lower portion of the lever 19 is inclined forwardly as shown at 22 in order to effect the required movement of the shaft 13 and yoke 14 without too great a movement of the upper end of the lever 19. The slot 18 is provided to allow for the difference in the centers about which the crank 16 and the lever 19 move. A lateral extension 23 is secured to the upper end of the lever 19 and projects through a slot 24 in the wall lining 10 to a point near the dash and steering column and within easy reach of the driver. The emergency brake may be placed on the left hand side of the car or may be replaced by a pedal 25 so that the floor is left entirely unobstructed.

From the foregoing description it will be seen that I have provided a gear shift control mechanism which leaves the front part of the tonneau practically clear of obstruction and which may have a handle located where it is most convenient for the driver. It will also be noted that the invention may be installed on any motor vehicle having a standard shift without any material alteration in the shifting mechanism per se. While I have described in detail one specific embodiment of the invention, it will be noted that this may be considerably modified without departing materially from the scope of the invention as claimed.

What I claim is:

In a motor vehicle, the combination of a tonneau having a hollow side wall, a transmission gear case, a gear shift yoke, a slidable rock shaft on which the yoke is secured, said rock shaft extending transversely of the tonneau and contiguous with the floor thereof, a crank arm on said rock shaft extending into the cavity in the side wall, and a hand lever having a universal connection at its lower end to the frame of the vehicle, said lever extending upwardly within said cavity and inwardly through the lining of the side wall to a point in front of and above the driver's seat, said lever having an intermediate operative connection with the crank arm to shift the shaft in the direction of its length.

In testimony whereof I have hereunto signed my name to this specification.

ARTHUR H. MUMAUGH.